3,256,300
BICYCLIC ESTER-LACTONES
James C. Wygant, Creve Coeur, and Erhard J. Prill, Des Peres, Mo., assignors to Monsanto Company, a corporation of Delaware
No Drawing. Filed Oct. 12, 1961, Ser. No. 144,567
4 Claims. (Cl. 260—343.3)

This invention relates to ester-lactones. In one aspect, this invention relates to bicyclic ester-lactones of alkyl-$\Delta^4$-tetrahydrophthalic anhydrides. In another aspect, this invention relates to methods for producing bicyclic ester-lactones of alkyl-$\Delta^4$-tetrahydrophthalic anhydrides. In another aspect, this invention relates to polyvinyl halide resin compositions containing a plasticizing amount of a bicyclic ester-lactone and methods for producing the same.

The bicyclic acid-lactones of the alkyl-$\Delta^4$-tetrahydrophthalic anhydrides are disclosed and claimed in copending application Serial No. 144,585, filed of even date and now abandoned. It is desirable to prepare bicyclic ester-lactones from these bicyclic acid-lactones and thus avoid the formation of diesters of the $\Delta^4$-tetrahydrophthalic anhydrides as byproducts.

An object of this invention is to provide a process for producing bicyclic ester-lactones of the alkyl-$\Delta^4$-tetrahydrophthalic anhydrides.

Another object of this invention is to provide a process for reacting an alkyl-$\Delta^4$-tetrahydrophthalic acid-lactone salt with an organic halide.

Another object of this invention is to provide bicyclic ester-lactones of alkyl-$\Delta^4$-tetrahydrophthalic anhydrides as new products.

Another object of this invention is to provide methods for plasticizing polyvinyl halide resins by incorporating therewith a plasticizing amount of a bicyclic ester-lactone of an alkyl-$\Delta^4$-tetrahydrophthalic anhydride.

Another object of this invention is to provide polyvinyl halide resin compositions containing a plasticizing amount of a bicyclic ester-lactone of an alkyl-$\Delta^4$-tetrahydrophthalic anhydride.

Other objects and advantages of this invention will be apparent to one skilled in the art upon studying this disclosure.

In accordance with this invention, an alkyl-$\Delta^4$-tetrahydrophthalic acid-lactone salt is reacted with an organic halide to form an alkyl-$\Delta^4$-tetrahydrophthalic ester-lactone as illustrated by the following equation:

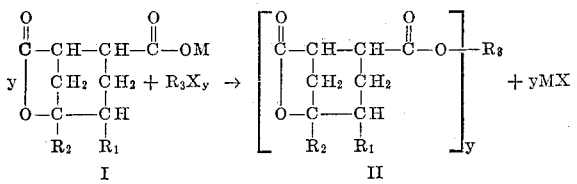

wherein $R_1$ is selected from the group consisting of hydrogen and alkyl, $R_2$ is alkyl, M is selected from the group consisting of alkali metal and tertiary ammonium ion, X is selected from the group consisting of chlorine, bromine and iodine, $R_3$ is selected from the group consisting of alkyl, aralkyl, haloaralkyl, and alkenyl, and y is a whole number selected from the group consisting of 1 and 2.

Further, in accordance with this invention, there are provided, as new compounds, bicyclic ester-lactones of the Formula II above.

Further, in accordance with this invention, there are provided methods for plasticizing polyvinyl halide resins by incorporating with said resins a plasticizing amount of a bicyclic ester-lactone of the Formula II above.

Further, in accordance with this invention, there are provided improved polyvinyl halide resin compositions comprising polyvinyl halide resin and a plasticizing amount of a bicyclic ester-lactone of the Formula II above.

The alkyl-$\Delta^4$-tetrahydrophthalic acid-lactone reactants suitable for use in this invention can be prepared as disclosed and claimed in copending application Serial No. 144,585, filed of even date and now abandoned, by the acid-catalyzed hydrolysis/lactonization of an alkyl-$\Delta^4$-tetrahydrophthalic anhydride. The alkyl-$\Delta^4$-tetrahydrophthalic anhydrides suitable for use in this invention have alkyl groups on either one or both of the carbon atoms comprising the ethylenic unsaturation. There must be at least one alkyl group, as represented by $R_2$ in the formula above, in order for the bicyclic acid-lactone to be formed from the corresponding anhydride by hydrolysis and lactonization in substantial yield. Thus, $R_1$ in the formula above may be either hydrogen or alkyl but $R_2$ must always be alkyl. The alkyl radicals as represented by $R_1$ and $R_2$ are lower alkyl radicals and ordinarily are alkyl radicals having not more than 6 carbon atoms. Examples of some suitable alkyl radicals include methyl, ethyl, isopropyl, butyl, tert-butyl, hexyl, and the like. The alkyl-$\Delta^4$-tetrahydrophthalic anhydrides are known to those skilled in the art and are readily prepared by heating an alkyl-substituted butadiene, for example, 2-methyl-1,3-butadiene with maleic anhydride, preferably in a hydrocarbon solvent.

The bicyclic acid-lactone reactants are preferably used in the form of either an alkali metal or a tertiary amine salt. Thus, M in the equation above is selected from the group consisting of alkali metal and tertiary ammonium ion. The alkali metal may be either sodium, potassium or lithium. The tertiary amine is preferably a saturated tertiary aliphatic amine containing from 1 to 24 carbon atoms. Preferably, the amine is a tertiary alkylamine. Examples of suitable tertiary amines include trimethylamine, triethylamine, tri-n-propylamine, triisopropylamine, trihexylamine, methyldiethylamine, dimethylethylamine, dimethylcyclohexylamine, diethylhexylamine, and the like.

The organic halide reactants identified by $R_3X_y$ in the equation above may be any mono or dihalide wherein $R_3$ is either an alkyl, aralkyl, haloaralkyl, or alkenyl radical. These radicals may be either straight-chain or branched-chain and preferably contain fewer than 21 carbon atoms even though this invention is not limited by the number of carbon atoms in the $R_3$ radical. Examples of suitable alkyl radicals include methyl, ethyl, isopropyl, tert-butyl, octyl, dodecyl, hexadecyl, eicosyl, and the like. Examples of suitable aralkyl radicals include benzyl, amylbenzyl, phenylethyl, phenylpropyl, and the like. Examples of suitable haloaralkyl radicals include 2-chlorobenzyl, 4-bromobenzyl, 5-iodobenzyl, 2,6-dibromobenzyl, 3,4-dichlorobenzyl, and the like. Examples of suitable alkenyl radicals include propenyl, hexenyl, decenyl, pentadecenyl, and the like. The halide, as represented by X in the formula in the equation above, may be any halide but preferably is either chlorine, bromine, or iodine. The organic halide is either a mono or a dihalide depending upon whether y in the equation above is either a whole number of 1 or 2. The halogens in the dihalides may be either the same or different but preferably are the same.

The bicyclic acid-lactone salts are prepared by methods well known to those skilled in the art. For example, the alkali metal acid-lactone salts can be readily prepared by neutralizing the acid-lactone with an alkali metal carbonate solution for example, sodium carbonate, and removing the liquid by evaporation. The tertiary amine acid-lactone salts can be prepared by reacting a stoichiometric amount of the acid-lactone and the tertiary amine at room temperature; however, a temperature up to 200° C. is often used. In a preferred embodiment of this invention, the tertiary amine acid-lactone salt is formed in situ by reacting the acid-lactone with the tertiary amine in the presence of the organic halide without first forming the salt and recovering it as such.

The process of this invention is usually carried out at a temperature below about 200° C. because the use of more elevated temperatures sometimes results in the formation of the diester of the $\Delta^4$-tetrahydrophthalic anhydride. The process can be conducted a temperatures as low as 50° C.; however, it is usually desirable to use a higher temperature in order to have a relatively short reaction time. Preferably a temperature in the range of 100–175° C. is used. Ordinarily the reactions involved are carried out at substantially atmospheric pressure although pressures above atmospheric may be employed with more volatile reactants. An inert diluent or solvent is not normally used although an inert reaction medium could be used if desired. The reactions are usually carried out using stoichiometric proportions of reactants or, preferably, a slight excess of the organic halide reactant. Thus, the formation of the bis(bicyclic ester-lactones) requires the use of at least 2 moles of the acid-lactone per mole of the organic dihalide. In the embodiment employing the tertiary amine acid-lactone salt formed in situ, a molecular equivalent of the tertiary amine is used. Thus, in this embodiment, the tertiary amine is in effect a reactant, not a catalyst. However, the tertiary amine can be used as a catalyst in the embodiment employing the alkali metal acid-lactone salt and for this use a catalytic amount, i.e., less than 10% of the tertiary amine, is added to the reaction mixture. No other catalyst is ordinarily required in the process of this invention.

The bicyclic ester-lactone is recovered from the reaction mixture and purified in the usual manner such as by distillation, solvent extraction, selective adsorption, filtration, decantation or crystallization procedures.

The bicyclic ester-lactone products of this invention are stable liquid compounds which range in color from colorless to a light yellow and which range in viscosity from very fluid to very viscous. The boiling points of these compounds are very high, usually above about 200° C. These bicyclic ester-lactones have good solvent properties and are soluble in heptane, benzene, alcohols, ethers, ketones, and the like, but are insoluble in water.

The bicyclic ester-lactone products of this invention are advantageously used for a variety of industrial purposes. Since these ester-lactones are characterized by having low volatility and good viscosity characteristics, they find use as functional fluids in hydraulic fluid systems as well as vacuum systems. Also, since the bicyclic ester-lactones of this invention are characterized by having low volatility and low extractibility characteristics, they find extensive use as plasticizers for various synthetic resins, particularly the vinyl halide resins, such as polyvinyl chloride, to form softened compositions of increased resiliency and flexibility which is retained at low temperatures as well as at high temperatures. These bicyclic ester-lactones are also compatible with other polymers such as polyvinyl butyral, cellulose acetate butyrate, polystyrene and certain polyacrylates.

The advantages, desirability, and usefulness of the present invention are illustrated by the following examples.

*Example 1*

In this example, 1,4-tetramethylene bis(5-methyl-6-oxa-7-oxobicyclo[3.2.1]octane-2-carboxylate) was prepared from 0.32 mole of 5-methyl-6-oxa-7-oxobicyclo[3.2.1]octane-2-carboxylic acid, 0.15 mole of 1,4-dichlorobutane and 0.32 mole of triethylamine. The reactants were heated together in a reaction flask at a temperature in the range of 100–150° C. for a period of 4 hours. Thereafter, the reaction mixture was diluted with diethyl ether and successively washed with water, dilute hydrochloric acid, water, dilute sodium hydroxide and water. The washed reaction mixture was then distilled under vacuum to obtain the 1,4-tetramethylene bis(5-methyl-6-oxa-7-oxobicyclo[3.2.1]octane-2-carboxylate) boiling at 190–290° C./0.3 mm. Analysis of the product was found to be 62.3% carbon and 7.2% hydrogen as compared with calculated values of 62.6% carbon and 7.2% hydrogen.

*Example 2*

In this example, benzyl 5-methyl-6-oxa-7-oxobicyclo[3.2.1]octane-2-carboxylate was prepared from 0.42 mole of sodium 5-methyl-6-oxa-7-oxobicyclo[3.2.1]octane-2-carboxylate and 0.84 mole of benzyl chloride using 1 ml. of triethylamine as catalyst. The reactants and catalysts were heated together in a reaction flask at a temperature in the range of 110–120° C. for a period of time of 4 hours. Thereafter, the reaction mixture was diluted with diethyl ether and successively washed with water, dilute hydrochloric acid, water, dilute sodium hydroxide and water. The washed reaction mixture was then distilled under vacuum to obtain the benzyl 5-methyl - 6 - oxa-7-oxobicyclo[3.2.1]octane-2-carboxylate boiling at 180–184° C./0.1 mm. Hg and having a refractive index $n_D^{25}$ 1.5289. The product was obtained in a yield of 91%. Analysis of the product was found to be 69.8% carbon and 7.1% hydrogen as compared with calculated values of 70.1% carbon and 6.6% hydrogen.

*Example 3*

In this example, the plasticizer properties of certain bicyclic ester-lactones of this invention was determined for use in polyvinyl chloride resins. A resin composition was formulated comprising 60 parts of the polyvinyl chloride resins and 40 parts of the bicyclic ester-lactones, including ¼ phr. of dibasic lead stearate as a heat stabilizer. These materials were mixed in a rolling mill to form a homogeneous blend. Visual inspection of the composition showed that all of the bicyclic ester-lactones were compatible with the polyvinyl chloride. Molded sheets of the mixture were clear and transparent. A resin composition containing tridecyl 5-methyl-6-oxa-7-oxobicyclo[3.2.1]octane-2-carboxylate was found to have a low-temperature flex point of −10° C., volatility of 1.8% plasticizer lost, kerosene extraction of 1.6% plasticizer lost and loop compatibility. A composition containing benzyl 5-methyl-6-oxa-7-oxobicyclo[3.2.1]octane-2-carboxylate was found to have a low temperature flex point of 11° C., volatility of 5.2% plasticizer lost, kerosene extraction of 0.25% plasticizer lost, and loop compatibility. The low temperature flexibility was determined in each case according to the Clash-Berg method wherein the tortional flexibility of the sample is determined at various temperatures. The volatility was determined according to the Carbon Absorption method of the Society of the Plastic Industry. The amount of kerosene extraction was determined by immersion of a sample in kerosene for a period of 24 hours, followed by a determination of the loss in weight of the sample.

The ratio of bicyclic ester-lactone to polyvinyl halide resin in the polyvinyl halide resin compositions of this invention may be varied over a wide range, depending upon the properties desired in the final product. For some purposes, a plasticizer content of say from only 2 to 5% would be desirable; however, usually a plasticizer content above 10% is used. The present bicyclic ester-lactone products are compatible with polyvinyl chloride over wide ranges and concentrations up to 50% of bicyclic ester-lactone based on the total weight of the plasticized composition.

This invention has been described particularly with reference to the use of the present bicyclic ester-lactones as plasticizers for polyvinyl chloride, but these bicyclic ester-lactones are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. Preferably such copolymers have vinyl chloride contents of at least 70% by weight and up to 30% by weight of the copolymerizible monomer.

The plasticized polyvinyl halide compositions of the present invention have good thermal stability; however, it may be desirable for various purposes to include known stabilizers in the plasticized compositions. In as much as the present bicyclic ester-lactones are substantially unreactive with the commercially available heat and light stabilizers which are commonly employed with polyvinyl halide resins, the presence of such materials in the plasticized compositions does not impair the valuable properties of the bicyclic ester-lactones.

The bicyclic ester-lactones of this invention, either singularly or in combination, are incorporated with the polyvinyl halide resin to form a plasticized polyvinyl halide resin by either milling or by dissolving therein the plasticizer in a mutual solvent and allowing the solvent to evaporate, or by any other conventional technique. Colors, dyes, extenders, pigments, and other compounding ingredients can be included in the plasticized polyvinyl halide composition if it is so desired.

Reasonable variation and modification of the invention as described are possible, the essence of which is that there have been provided: (1) a process for reacting alkyl-Δ⁴-tetrahydrophthalic acid-lactone salts with organic halides to form bicyclic ester-lactones of the same, (2) said bicyclic ester-lactones as new products, (3) methods for plasticizing polyvinyl halide resins by incorporating therewith a plasticizing amount of said bicyclic ester-lactones, and (4) plasticized polyvinyl halide compositions containing a plasticizing amount of said bicyclic ester-lactones.

Various other bicyclic ester-lactones within the scope of this invention are disclosed and described in our copending application Serial. No. 144,589, filed of even date, which application is incorporated herein by reference.

We claim:
1. A bicyclic ester-lactone of the formula

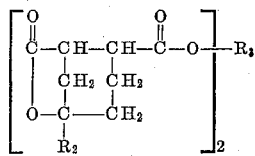

wherein $R_2$ is an unsubstituted lower alkyl radical containing up to 6 carbon atoms and $R_3$ is an unsubstituted divalent alkylene radical containing up to 20 carbon atoms.

2. Benzyl 5-methyl-6-oxa-7-oxobicyclo[3.2.1]octane-2-carboxylate.

3. Tridecyl 5-methyl-6-oxa-7-oxobicyclo[3.2.1]octane-2-carboxylate.

4. 1,4 - tetramethylene bis(5-methyl-6-oxa-7-oxobicyclo[3.2.1]octane-2-carboxylate).

References Cited by the Examiner

UNITED STATES PATENTS

| | | | |
|---|---|---|---|
| 2,863,877 | 12/1958 | Wheeler et al. | 260—343.3 |
| 2,924,582 | 2/1960 | Mullins et al. | 260—30.4 |
| 2,938,909 | 5/1960 | Wheeler et al. | 260—343.3 |
| 2,956,975 | 10/1960 | Greenspan | 260—39.4 |

OTHER REFERENCES

Kucherov et al.: Chem. Abs., vol. 54 (January 1960), pp. 1350–1.

Mousseron et al.: Comptes Rendus, vol. 247 (1958), pp. 564–8.

Peterson et al.: Indust. and Eng. Chem., vol. 49, No. 9, pt. II (1957), p. 1487.

Wagner et al.: Synthetic Org. Chemistry, John Wiley and Sons, New York (1953), p. 484.

WALTER A. MODANCE, *Primary Examiner.*

WILLIAM H. SHORT, NICHOLAS S. RIZZO,
*Examiners.*

R. C. STEWART, JAMES A. PATTEN,
*Assistant Examiners.*